(12) United States Patent
Blieske et al.

(10) Patent No.: US 10,763,627 B2
(45) Date of Patent: Sep. 1, 2020

(54) BUSBAR ADAPTER, AN ARRANGEMENT WITH A BUSBAR, AND A METHOD FOR CONNECTING A BUSBAR ADAPTER IN A BUSBAR

(71) Applicant: Selux AG, Berlin (DE)

(72) Inventors: Jan Blieske, Berlin (DE); Johannes Dinnebier, Berlin (DE)

(73) Assignee: Selux AG, Berlin (DE)

( * ) Notice: Subject to any disclaimer, the term of this patent is extended or adjusted under 35 U.S.C. 154(b) by 0 days.

(21) Appl. No.: 16/359,120

(22) Filed: Mar. 20, 2019

(65) Prior Publication Data

US 2019/0296509 A1    Sep. 26, 2019

(30) Foreign Application Priority Data

Mar. 21, 2018 (EP) .................................. 18163148

(51) Int. Cl.
| | | |
|---|---|---|
| H01R 25/14 | (2006.01) | |
| F21V 21/35 | (2006.01) | |
| H01R 13/44 | (2006.01) | |
| H01R 31/06 | (2006.01) | |
| H02B 1/04 | (2006.01) | |
| H02B 1/21 | (2006.01) | |
| H01R 13/70 | (2006.01) | |
| H01R 12/88 | (2011.01) | |

(52) U.S. Cl.
CPC .......... *H01R 25/142* (2013.01); *F21V 21/35* (2013.01); *H01R 13/44* (2013.01); *H01R 13/70* (2013.01); *H01R 25/145* (2013.01); *H01R 31/06* (2013.01); *H02B 1/04* (2013.01); *H02B 1/21* (2013.01); *H01R 12/88* (2013.01)

(58) Field of Classification Search
CPC .............................. H01R 25/145; H01R 12/88
See application file for complete search history.

(56) References Cited

U.S. PATENT DOCUMENTS

| 6,896,534 B2 * | 5/2005 | Ruckerbauer | G01R 1/0466 439/259 |
| 7,819,676 B1 * | 10/2010 | Cardoso | H01R 13/245 439/115 |
| 9,281,645 B2 * | 3/2016 | Dinnebier | F21V 21/35 |

* cited by examiner

*Primary Examiner* — Tho D Ta
(74) *Attorney, Agent, or Firm* — Harness Dickey

(57) ABSTRACT

The invention concerns a busbar adapter (1) with a housing; contact elements (5), on each of which an electrical connection (12) is formed and which are displaceably arranged in the housing, in such a way that the contact elements (5) can each be displaced between an extended position, in which the electrical connection (12) protrudes outwards in the region of a side face on the housing and by means of which electrical connection (12) an electrical contact to a busbar can be made, and a retracted position, in which the electrical connection (12) is arranged in the housing and the electrical contact is broken; and a single camshaft (9) which is arranged in the housing such that it can rotate and which has an arrangement of cams (10) which, for actuating the contact elements (5), are in each case assigned to at least one of the contact elements (5), in such a way that the contact elements (5) can be displaced in each case between the retracted and the extended position by rotation of the single camshaft (9). An arrangement with a busbar which has a mounting space for one or a plurality of busbar adapters and a method for connecting a busbar adapter (1) in a busbar are also provided.

13 Claims, 7 Drawing Sheets

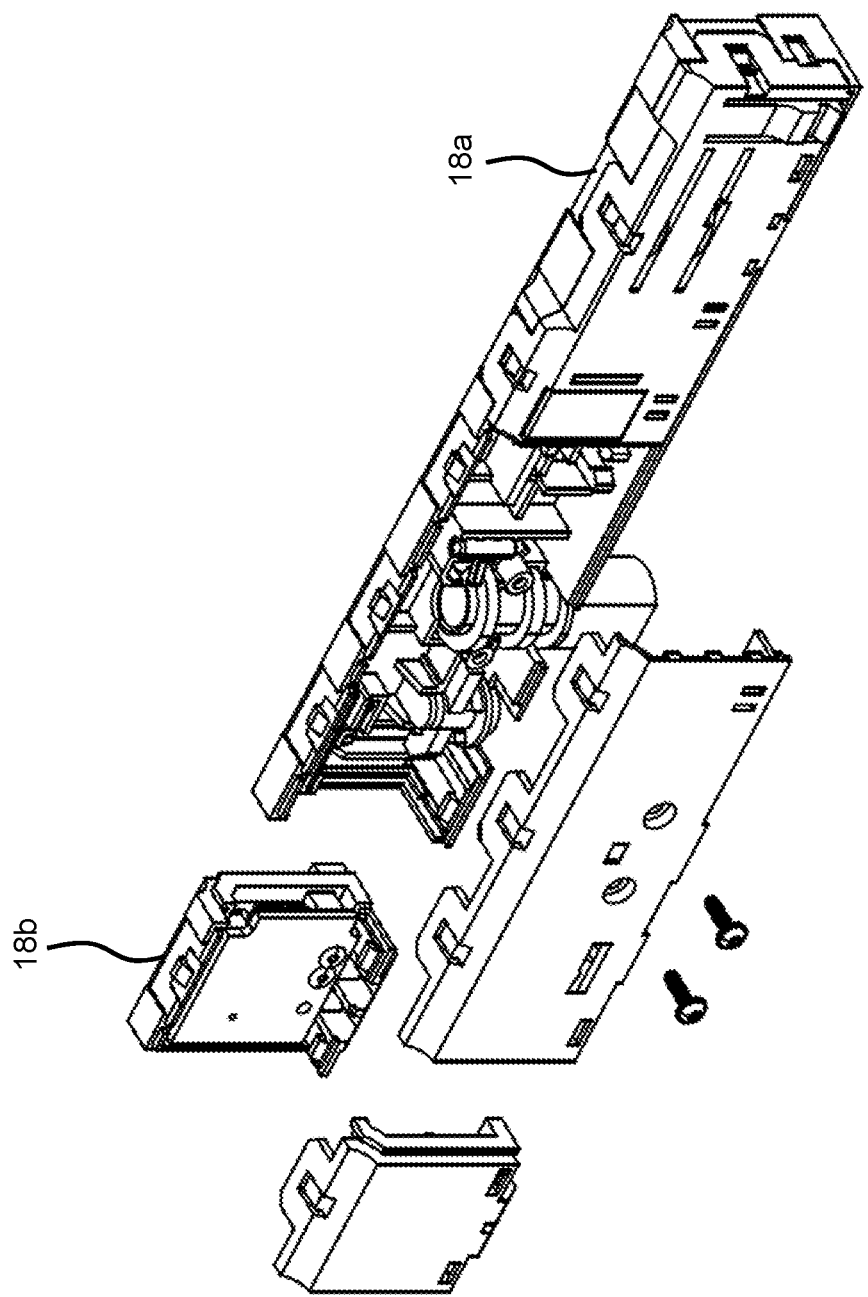

BUSBAR ADAPTER, AN ARRANGEMENT WITH A BUSBAR, AND A METHOD FOR CONNECTING A BUSBAR ADAPTER IN A BUSBAR

CROSS-REFERENCE TO RELATED APPLICATIONS

This application claims priority to European Serial No. 181631482 filed Mar. 21, 2018. The disclosure of the above application is incorporated herein by reference.

The invention concerns a busbar adapter, an arrangement with a busbar, and a method for connecting a busbar adapter in a busbar.

BACKGROUND

Such busbar adapters are used to couple one or a plurality of consumer devices, e.g. lamps, to a busbar, which provides and distributes electrical energy. Here, the busbar adapter is detachably attached to the busbar. Electrical contact is established by forming an electrical connection between the electrical conductors of the busbar and electrical connections of the adapter. In addition, the busbar adapter is routinely mechanically attached to the busbar. An electrical consumer device, for example a lighting device, can be connected via a connecting device of the busbar adapter.

From the document DE 39 02 695 A1, a current collector for an electrical busbar is known, which has a camshaft mechanism for the actuation of attachment fingers and phase contact fingers.

The document DE 22 105 16 discloses an adapter for busbars in which circular disc segments are used as contact elements.

The document EP 0 241 318 A2 provides for a pivoting actuation element on a busbar adapter which is used to actuate locking elements when the pivoting actuation element is moved into a pivoted position, thereby mechanically attaching the busbar adapter to the busbar.

A pivoting component is also provided for an electrical connector in the document EP 0 074 754 A2. In an initial position, when the pivoting component is pivoted inwards, contact tabs engage with an associated housing opening in such a way that the contact tabs protruding outwards from the housing make contact with busbar contacts. If the pivoting component is pivoted outwards, the contact tabs are forcibly driven into the housing of the connector against a preload. The connector can be inserted into or removed from the busbars. When the pivoting component is pivoted inwards, the contact tabs automatically pivot out of the housing due to the preload and close the electrical contacts, provided that a complete outward pivoting movement is enabled by virtue of a correct insertion into the busbar.

Another busbar adapter is of known from document DE 69 303 843 T2. An adjusting device is mounted on the adapter housing such that it can be pivoted in such a way that strip-form contact arms can be pivoted transversely to their longitudinal direction, so that contact tongues can be brought into and out of contact with conductor rails of the busbar.

The document DE 20 2010 004 783 U1 describes a busbar adapter for attaching a lighting fixture or a spotlight to a U-shaped busbar. Sliding actuating elements are arranged on an outer peripheral surface, with which mechanical locking elements and/or electrical contacts can be transferred from an inward pivoted position to an outward pivoted position.

The document DE 2 250 738 A1 discloses a detachable current collector device for a busbar having an essentially U-shaped cross-section. An actuating lever can be pivoted around a switching axis standing upright on the base of a plinth, and serves to pivot wing-form locking elements inwards and outwards.

A busbar adapter and an arrangement with a busbar adapter and a busbar are of known from the document EP 2 822 108 B1. The busbar adapter has an actuation element on the housing, which can be displaced between a detached position and a coupled position. A force application element with a wedge-shaped section is arranged on the actuation element.

SUMMARY

The object of the invention is to specify a busbar adapter, an arrangement with a busbar and a busbar adapter, as well as a method for making contact with a busbar adapter, which enable a simplified mounting of the busbar adapter onto the busbar, and flexible contact with contact elements of the busbar adapter.

The object is achieved with a busbar adapter created in accordance with the independent claim 1. Furthermore, an arrangement with a busbar and a busbar adapter, as well as a method for connecting a busbar adapter in a busbar are created in accordance with the independent claims 13 and 14. Embodiments are the subject matter of dependent subclaims.

In accordance with one aspect, a busbar adapter is created with a housing and contact elements. An electrical connection is formed on each of the contact elements. The contact elements are displaceably arranged in the housing in such a way that the contact elements can each be displaced between an extended position, in which the electrical connection protrudes outwards in the region of a side face on the housing, and by means of the electrical connection an electrical contact can be formed with (conductors of) a busbar, and a retracted position, in which the electrical connection is arranged in the housing and the electrical contact is broken. A single camshaft is provided, which is arranged in such a way that it can rotate in the housing and has an arrangement of cams, which are each associated with at least one of the contact elements for purposes of actuating the contact elements, such that the contact elements can each be displaced between the retracted and the extended position by the rotation of the single camshaft.

In accordance with another aspect, an arrangement is created with a busbar, which has a mounting space for one or a plurality of busbar adapters, and a busbar adapter, which is arranged in the mounting space of the busbar.

In accordance with another aspect, a method is created for connecting a busbar adapter in a busbar. In the method, a busbar adapter with a housing and contact elements is provided, on each of which an electrical connection is formed, and which are arranged in such a way that they can be displaced in the housing, such that the contact elements can each be displaced between an extended position, in which the electrical connection protrudes outwards in the region of a side face on the housing, and an electrical contact with a busbar can be made by means of the electrical connection, and a retracted position, in which the electrical connection is arranged in the housing and the electrical contact is broken. The busbar adapter is arranged in a busbar and makes contact in the busbar, wherein a single camshaft, which is arranged in such a way that it can rotate in the housing of the busbar adapter and has an arrangement of cams, which are each associated with at least one of the contact elements, is rotated such that at least one of the contact elements is displaced from the retracted into the extended position and thereby makes contact with an electrical connection of the busbar.

With the busbar adapter, the plurality of contact elements can be actuated with just a single camshaft, so as to be displaced in each case between the retracted and the extended position. In the extended position, when the electrical connection of the contact element protrudes outwards in the vicinity of the side face of the housing, electrical contact is made with an opposing electrical connection or contact of the busbar, when the busbar adapter is inserted into the busbar. The single camshaft can be rotated so as to extend and retract one or a plurality of the contact elements. Different configurations of extended and retracted contact elements can be provided in a flexible manner in the different rotational positions of the single camshaft. Only the rotation of the single camshaft is required for this purpose.

The feet of each of the contact elements can be arranged on a contact block, which is detachably arranged in the housing. Provision can be made for the contact elements to be arranged on a contact block in such a way that they cannot rotate. For this purpose, the contact elements can have one or a plurality of bends, which have, for example, S-shaped or U-shaped sections, which interact with one or a plurality of protrusions on the contact block so as to prevent rotation, when the foot of the contact element is inserted.

The feet of the contact elements can be detachably inserted into an associated contact seating on the contact block. There they can be electrically connected and mechanically secured. Alternatively, an attachment by means of a screw contact can be provided. The contact seating for the contact elements on the contact block can be the same for all contact elements. Alternatively, different configurations can be provided. The contact block can in turn be detachably mounted in the housing. The detachable arrangement of the contact block in the housing allows the use of interchangeable or replaceable contact blocks to adapt the busbar adapter to different application requirements, such as, for example, different applications in which a different number of contact elements is required. The contact elements can be detachably arranged on the contact block on one side. On an opposite side, the contact block can have contact terminal connections to electrically connect the contact block, in particular to transmit an electrical voltage tapped by way of the contact elements on the busbar. The contact terminal connections of the contact block can be connected by means of associated contact seatings with supply lines to a mounted lighting fixture.

The single camshaft can be detachably arranged in the housing. In this way, the single camshaft is mounted in the housing such that it can be replaced. Provision can be made to provide a first and a second camshaft that have different arrangements of cams, and can each be mounted in the housing of the busbar adapter. Single camshafts with different camshaft profiles can be provided. By this means the busbar adapter can be adapted to different applications, for example to different requirements in different countries, for example in Europe and the USA. With the contact elements, for example, contact elements can be designed for three phases and one neutral conductor, or for two phases and two neutral conductors.

A kit can be provided which has the first and second single camshaft for mounting in the housing of the busbar adapter. Alternatively or additionally, the kit can be designed with a first and a second contact block that provide different configurations for the contact elements, for example with different numbers of contact elements.

A first of the contact elements can have a cranked section, and a cam associated with a second of the contact elements for the actuation of the second contact element can be arranged in one rotational position of the single camshaft in the region of the cranked section and in another rotational position of the single camshaft outside the region of the cranked section. By means of the cranking, which is formed with a cranked section of the first contact element, a kind of "bypass" can be provided for the first contact element, if the cam is arranged in the region of the cranked section, so that the first contact element is not actuated in this case, hence, in particular is not displaced into the extended position. The first contact element is guided around the cam by means of the cranked section. Here, the first contact element in the region of the cranked section can come into contact with the cam or can be arranged free of any contact with the latter if the cam is located in the region of the cranked section or is arranged opposite the latter. However, both in the rotational position and in the other rotational position of the single camshaft, the cam does not cause any actuation of the first contact element. In fact, the cam displays its actuating action in conjunction with the second contact element. The provision of a cranked section on one or a plurality of the contact elements can support a compact design of the busbar adapter.

At least a first cam of the arrangement of cams can be jointly associated for actuation with two of the contact elements which are arranged on opposite sides with respect to the single camshaft, in such a way that in different rotational positions of the single camshaft in each case just one of the two contact elements is displaced by means of the first cam into the extended position. The extension of the two contact elements can take place on opposite sides of the busbar adapter housing.

At least a second cam of the arrangement of cams can be associated with just one of the contact elements for actuation, in such a way that the one contact element can be displaced by means of the second cam between the retracted and the extended position when the single camshaft is rotated. The second cam is free from actuation of another or an additional contact element when the single camshaft is rotated. Here, an exclusive assignment of the second cam to just the one contact element is provided.

The contact elements and the cams of the arrangement of cams can each be arranged in a plurality of superimposed planes. It can be provided that only one cam of the arrangement of cams is provided in each of the superimposed planes. In the planes of the contact elements, which optionally coincide individually or multiply with the planes of the cams, one or a plurality of contact elements can be arranged. Provision can be made for the cams to be arranged in at least three superimposed planes.

At least one of the contact elements can have a U-shaped bend, which accelerates the extension and retraction of the contact element relative to the rotation of the single camshaft, and increases the stroke in such a way that overlays in intermediate positions of the single camshaft are avoided. When rotating the single camshaft, the actuation of a contact can be closed or broken within a short angle of rotation so as to avoid any overlap in the actuation of contacts. Contact elements with at least one U-shaped bend achieve the required stroke of the contact element in the angle of rotation that is available.

The single camshaft can be functionally coupled to a locking device, which, in a locked position, secures the single camshaft in an initial rotational position and, in an unlocked position, permits the rotation of the single camshaft. By means of the locking device, the single camshaft can be secured in the initial position and optionally in at least one further rotational position. This means that the single camshaft is locked against rotation when the locking device is in the locked position. After unlocking, the single camshaft can be rotated. Provision can be made for a displacement of the locking device from the locked position to the unlocked position to be blocked if the busbar adapter is not correctly mounted in an associated busbar. If the busbar adapter is not installed correctly in the busbar, the locking device cannot be displaced from the locked position to the unlocked position. For example, provision can be made for a component of the locking device to be at least partially displaced into an assigned seating or recess on the busbar during the transition from the locked position to the unlocked position. If the busbar adapter is not correctly and functionally arranged on the busbar, this displacement is blocked. The component can only be displaced into the unlocked position if the busbar adapter is correctly mounted on the busbar. Here, provision can be made for a section of the component to be partially or completely displaced into the housing of the busbar adapter, at least in the locked position, and is displaced out of the housing during displacement into the unlocked position.

The locking device can have a locking member that is preloaded against displacement from a locked position of the locking member in which the locking device is locked, to an unlocked position of the locking member in which the locking device is unlocked. The preload can be embodied in terms of a spring that is assigned to the locking element. The locking element can, for example, take the form of the component that has been described above. The locking element can be formed with a slider, which is moved between the locked position and the unlocked position during displacement. Here, an end section of the slider element can be displaced into the assigned seating or opening of the housing of the busbar adapter, when the locking device is unlocked and thus the rotation of the single camshaft is released. Alternatively or additionally, a turnable or rotatable locking element can be provided.

The locking device can have movable elements associated with the locking element in the outer wall of the housing, for example housing tabs, the movement of which is blocked in a position by the locking element in such a way that a mechanical connection is formed between the busbar adapter and the busbar.

The single camshaft can be actuated for rotation without tools. For this purpose, an actuating element can be provided on the housing of the busbar adapter, which the user can actuate manually without tools, for example a rotational or a sliding element, wherein a sliding movement is converted into the rotational movement of the single camshaft by means of gearing. Alternatively, an actuating element can be provided on the housing, which can be actuated by means of a tool, for example by means of a screwdriver. The actuating element can be inserted into a housing recess or opening and can, for example, have a slot or a hexagon at which the screwdriver or a suitable key can be applied. An outer surface of the actuation element can be designed to be flush with a housing surface of the busbar adapter housing. In this embodiment, the actuation element can be completely embedded in the housing of the busbar adapter; with tool-free actuation, the actuation element can protrude from the housing.

The housing can have a plurality of housing parts; the contact elements can be arranged in a first housing part and a driver circuit, which provides a driver voltage during operation, in a second housing part. By this means a modular housing design is provided. In the region of a housing connection, the first and second housing parts can be detachably connected to each other at their end faces. The two housing parts can take the form of a basic housing, in which the contact elements and the single camshaft are accommodated, and a module housing that can be positioned or attached, in which further functional components for the busbar adapter are accommodated, in particular the driver circuit. The second housing part can be designed to be positioned flush with the first housing part. Provision can be made for the first and second housing parts to be detachably connected before mounting them in the busbar. Alternatively, the connection between the housing parts can be established after the first or second housing part has been previously mounted in the busbar. In the region of the housing connection, end face housing walls of the first and second housing parts can be arranged lying one on top of the other. A DALI power supply (DALI—"Digital Addressable Lighting Interface") can be provided in the second part of the housing.

A connection can be provided on the housing of the busbar adapter for the detachable mounting of a lighting device.

The contact elements in the housing of the busbar adapter can be made of a wire material, wherein the wire material can have a flat or a round cross-section.

The cams of the arrangement on the camshaft can be formed on the camshaft in one piece. Alternatively, provision can be made for one or more of the cams to be detachably mounted on the camshaft, for example by means of a clamping screw.

The contact elements in the housing of the busbar adapter can extend essentially in a longitudinal direction. Over their total length, one or a plurality of contact elements can have straight and rounded sections.

The embodiments for the busbar adapter exemplified above can correspondingly be provided in conjunction with the arrangement of the busbar adapter mounted in the busbar, and/or in conjunction with the method for connecting the busbar adapter to the busbar.

In the arrangement, the busbar adapter can be accommodated flush with the busbar.

DESCRIPTION OF EXEMPLARY EMBODIMENTS

In what follows, further exemplary embodiments are explained in more detail with reference to figures of one design. Here:

FIG. 8 shows another schematic view of a busbar adapter with a basic housing and a module housing detachably mounted on the latter.

Figure 1:
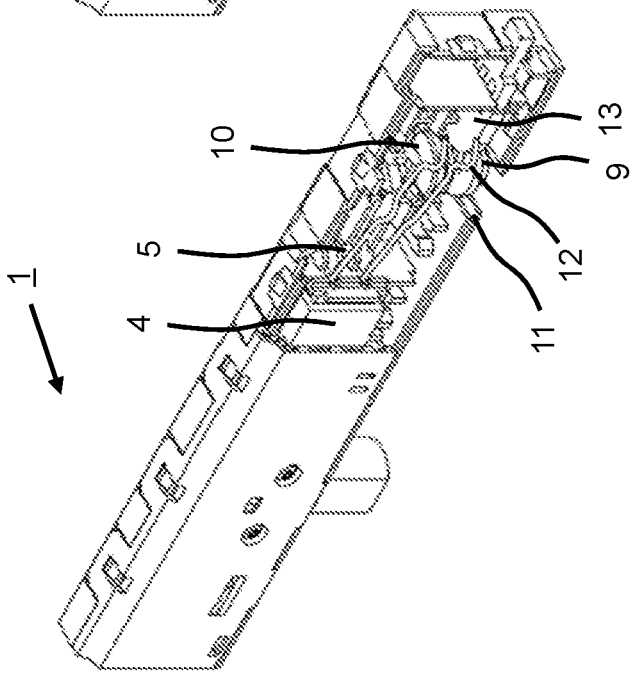
FIG. 1 shows a schematic view in perspective of a busbar adapter in which a wall section of a housing has been removed.

FIG. 1 shows a schematic perspective of a busbar adapter 1 with a housing 2 on which a seating 3 is arranged. The seating 3 serves to enable the detachable mounting of a lighting device (not shown), which can be mounted on the busbar adapter 1 for purposes of operation.

A contact block 4 is detachably mounted in the housing 2. The contact block 4 is shown in detail in FIG. 3. Contact elements 5 with lower contact elements 5*a*, 5*b* and with upper contact elements 5*c*, 5*d* are arranged in associated contact seatings 6 on the front side of the contact block 4, wherein this assembly is detachably in the embodiment shown, for example by means of plug contacts. At the rear of the contact block 4, contact terminal connections 7 are provided, which serve to make electrical contact with the contact block 4 in the housing 2, so that the electrical energy received via the contact elements 5 in the busbar adapter 1 can be transferred from the contact block 4 to a driver device, which serves to provide a driver voltage for the operation of the lighting device, which as such is of known art in various embodiments.

Figure 3:
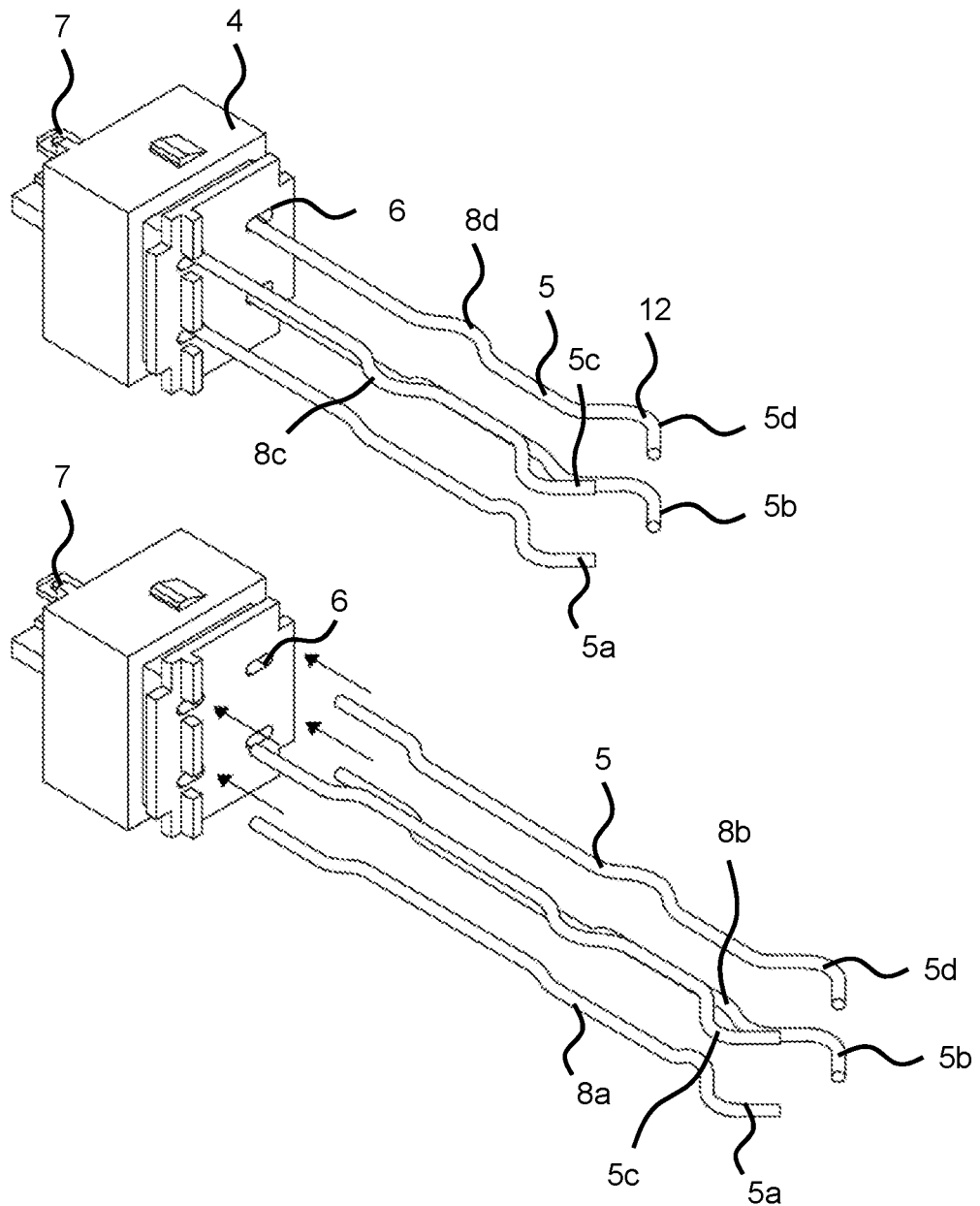
FIG. 3 shows schematic views in perspective of a contact block with contact elements arranged on the latter and detached from the latter.

As shown in FIG. 3, the lower contact elements 5*a*, 5*b*, in contrast to the upper contact elements 5*c*, 5*d*, each have a cranked section 8*a*, 8*b*. The upper contact elements 5*c*, 5*d* each have a U-shaped bend 8*c*, 8*d*.

Figure 2:
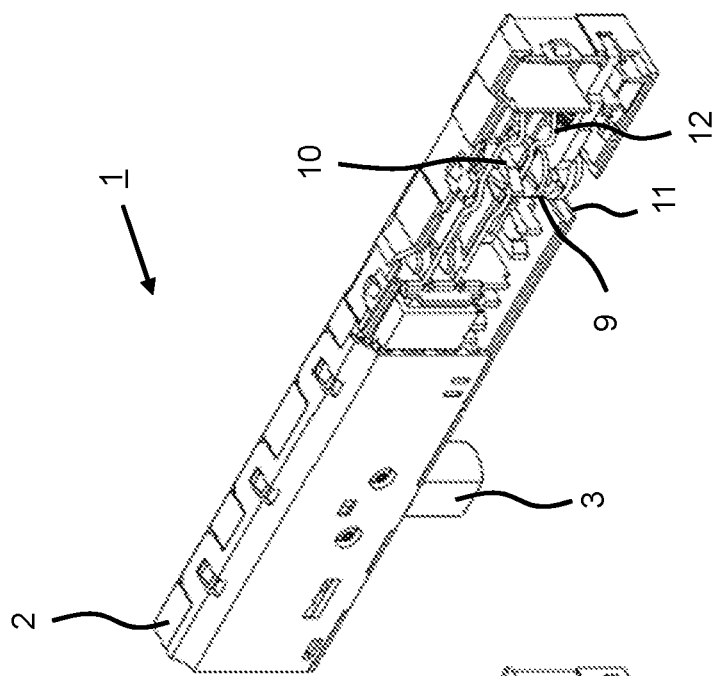
FIG. 2 shows another schematic view in perspective of the busbar adapter in FIG. 1.

As shown in FIGS. 1 and 2, a single camshaft 9 with an arrangement of cams 10 is associated to the contact elements 5 in the housing 2 of the busbar adapter 1. The camshaft 9 is mounted on a housing seating 11 in such a way that it can rotate. By means of the arrangement of cams 10, each of the contact elements 5 can be displaced between a retracted and an extended position. In the extended position, the contact element(s) 5 is/are displaced outwards in such a way that a respective electrical connection 12 of the contact elements 5 protrudes outwards through an associated opening in the housing 2 (see FIG. 2—extended position), which makes it possible to form an electrical contact with an associated electrical connection of a busbar (not shown), into which the busbar adapter 1 is inserted for operation. In FIG. 1, the electrical connections 12 are in a retracted position.

The contact elements 5, which for example consist of a wire material that can have a flat or a round cross-section, are preloaded against displacement into the extended position and thus automatically return to the retracted position when the compressive force provided by an associated cam of the arrangement of cams 10 for extension decreases when the cam is rotated away from the associated contact element 5 during rotation of the single camshaft 9. The preload against displacement into the extended position exists by virtue of the bending stress of the contact elements 5.

While the bend is formed in the region of the electrical connection 12 and the U-shaped bends 8*c*, 8*d* in a horizontal plane, the cranked sections 8*a*, 8*b* extend in a horizontal plane oriented transversely thereto.

Figure 4:
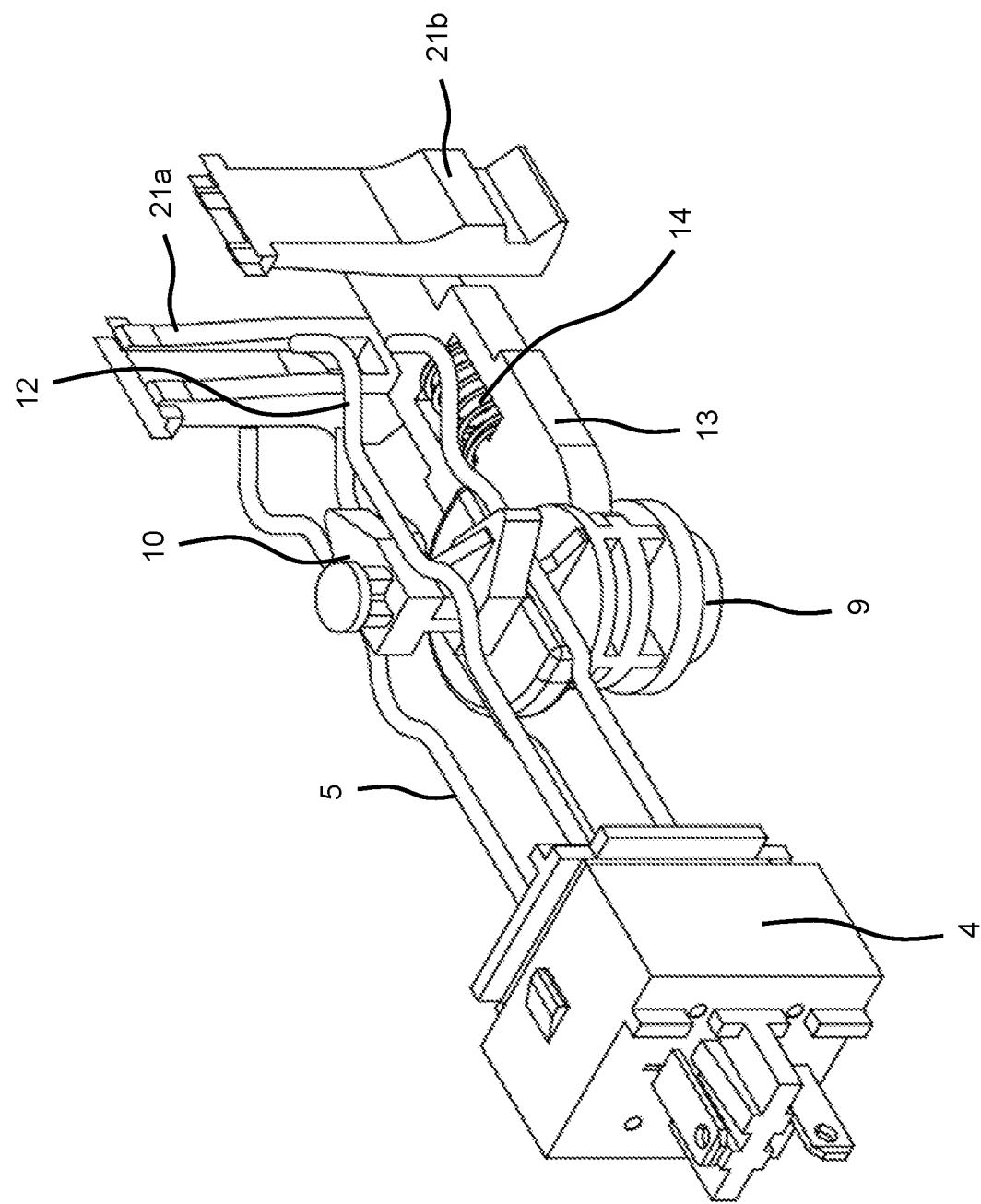
FIG. 4 shows an enlarged schematic view in perspective of a section of the busbar adapter in FIG. 1.

FIG. 4 shows an enlarged view in perspective of elements of the busbar adapter from FIGS. 1 and 2 with the contact block 4, the contact elements 5, and the single camshaft 10. In the embodiment shown, a locking element 13 embodied as a slider element is assigned to the single camshaft 10. The locking element 13 is shown in FIG. 4 in a locked position, in which the locking element 13 secures the camshaft 9 in the current rotational position and prevents it from rotating. The locking element 13 is preloaded by means of a spring 14 against displacement from the locked position shown into an unlocked position. In the unlocked position, the camshaft 9 is released for a rotation, which then allows the contact elements 5 to be extended and retracted using the arrangement of cams 10.

Figure 5:
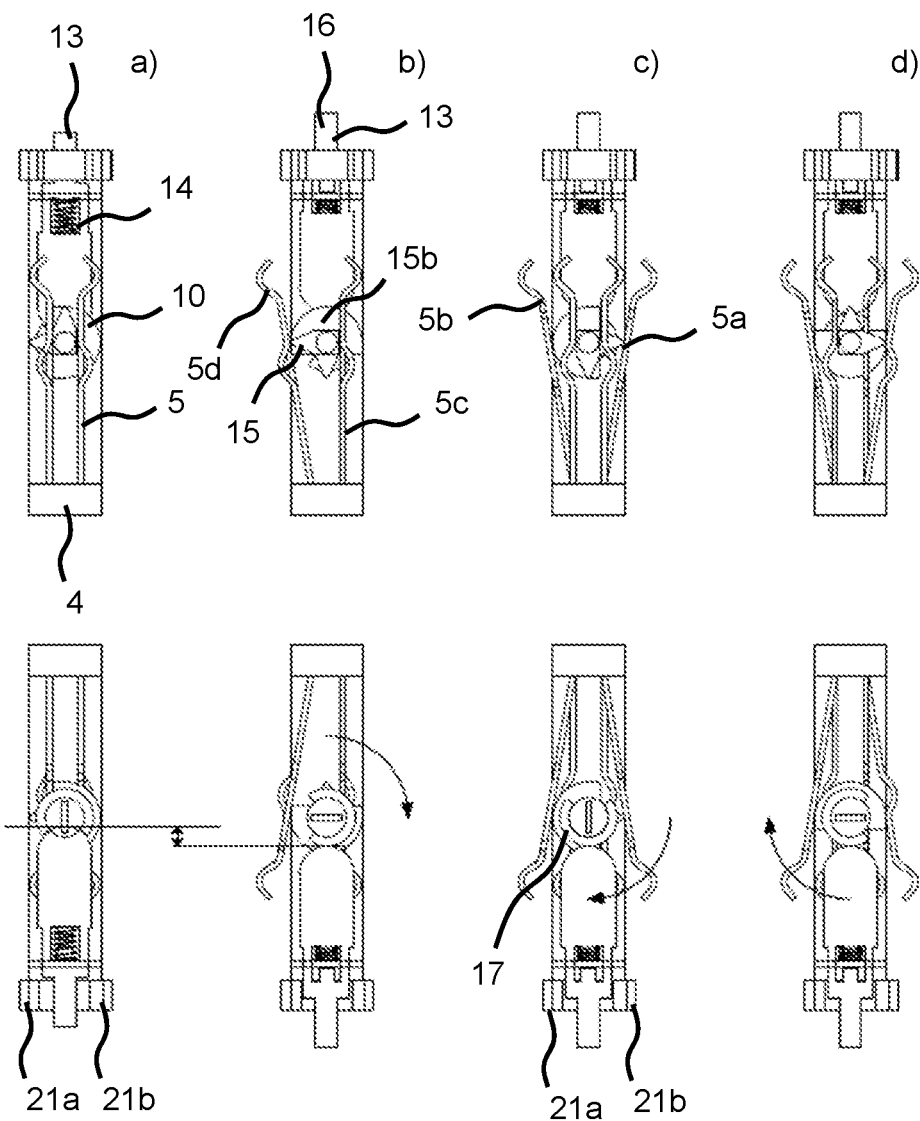
FIG. 5 shows schematic views of different rotational positions of a single camshaft for the actuation of the contact elements.

FIG. 5 shows schematic views for different rotational positions of the single camshaft 9. The arrangement illustrated is shown from above and below with the contact block 4, the contact elements 5, and the single camshaft 9. In the rotational position a), the single camshaft 9 is in an initial position in which the single camshaft 9 is secured against rotation by means of the locking element 13. None of the contact elements 5 is in an extended position. In fact, all the contact elements 5 are in the retracted position, in which the electrical connections 12 do not protrude outwards beyond the housing 2 of the busbar adapter 1.

In the rotational position b), a first cam 15*a* pushes the upper contact element 5*d* into the extended position, and a second cam 15*b* simultaneously pushes the contact element 5*b* located behind/below into the extended position. Here, the locking element 13 is pushed outwards against the preload of the spring 14. If the busbar adapter 1 is correctly inserted into a busbar, the distal end of the locking element 13 can be pushed between tabs 21*a*, 21*b* on the housing 2 and then establishes a mechanical connection to the busbar. If the busbar adapter 1 is not mounted correctly in the busbar, the associated opening between the tabs 21*a*, 21*b* is not available for the movement of the distal end 16, so that the locking element 13 cannot be moved into the unlocked position. In this way, a safety measure is created for the correct mounting of the busbar adapter 1 in the mounting space of an associated busbar.

In the rotational position c) in FIG. 5, the lower contact elements 5*a*, 5*b* are displaced into the extended position by means of the arrangement of cams 10 and cams 5*b* on the single camshaft 9, whereas the upper contact elements 5*c*, 5*d* are arranged in the retracted position.

In the rotational position d) in FIG. 5, one of the lower contact elements 5*a*, 5*b* and one of the upper contact elements 5*c*, 5*d* are each in the extended position.

Provision can be made for one contact element for a neutral conductor to be extended in a plurality of rotational positions of the single camshaft, for example in three rotational positions, whereas other contact elements are only extended in one of the rotational positions at a time.

In conjunction with the rotational positions b), c) and d), a cam 17 associated with the locking element 13 presses against the locking element 13 in order to displace it against the preload of the spring 14. The cam 17 is arranged together with the arrangement of cams 10 on the single camshaft 9.

Figure 6:
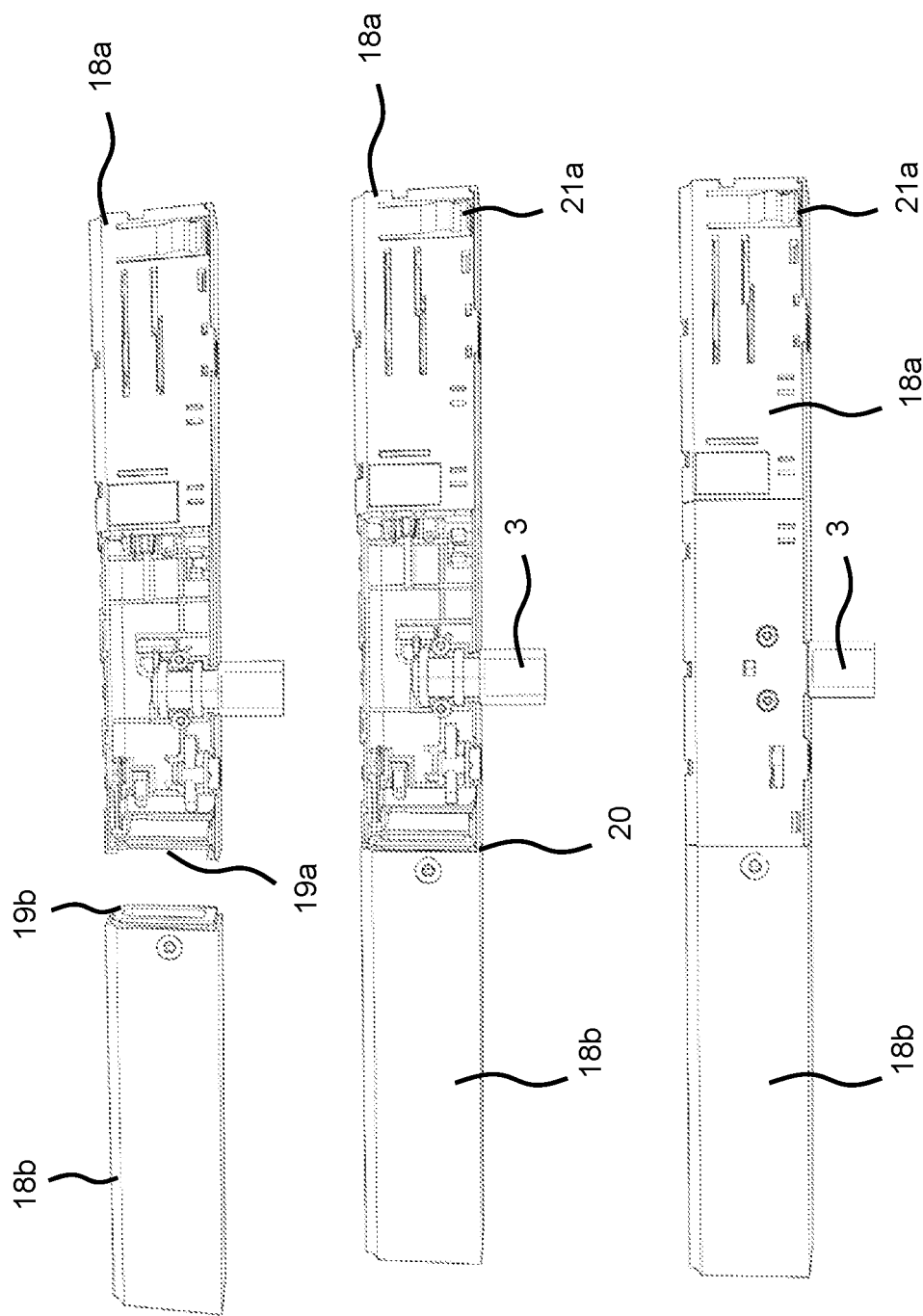
FIG. 6 shows a schematic view of a busbar adapter with a basic housing and a module housing detachably mounted on the latter.

FIG. 6 shows schematic views in perspective for the busbar adapter 1, wherein a first housing part 18*a*, which forms a basic housing with the above-described contact device and the seating 3, and has a second housing part 18*b* arranged flush on the end face hereof, which forms a module housing and is detachably mounted. A driver circuit can be arranged in the module housing 18*b*, with which the electrical voltage tapped off by way of the contact elements 5 is converted into a driver voltage for the lighting device to be coupled. End face housing surfaces 19*a*, 19*b* are arranged opposite each other in the region of a housing connection 20 between the basic housing and the module housing.

Tabs 21*a*, 21*b* formed on the first housing part 18*a* on opposite sides (see also FIG. 5) interact with the locking element 13 in such a way that the elastically resilient tabs 21a, 21b are first pressed inwards when they are inserted into the busbar (see left-hand view below in FIG. 5) and thus prevent the locking element 13 from moving in a direction away from the single camshaft 9. In this position, the locking element 13 prevents the single camshaft 9 from rotating. When the busbar adapter 1 is then correctly arranged in the busbar, the tabs 21a, 21b move back to their initial position (see further views in FIG. 5 below) and release the locking element 13, which moves backwards, in turn releases the single camshaft 9 so that it can rotate, and slides between the tabs 21a, 21b, where it prevents them from moving into the housing, and thus creates a mechanical connection between the busbar adapter 1 and the busbar.

In the unlocked position, the locking element 13 moves between the tabs 21a, 21b, thus blocking their inwards movement and creating a mechanical locking of the busbar adapter 1 with the busbar.

Figure 7:
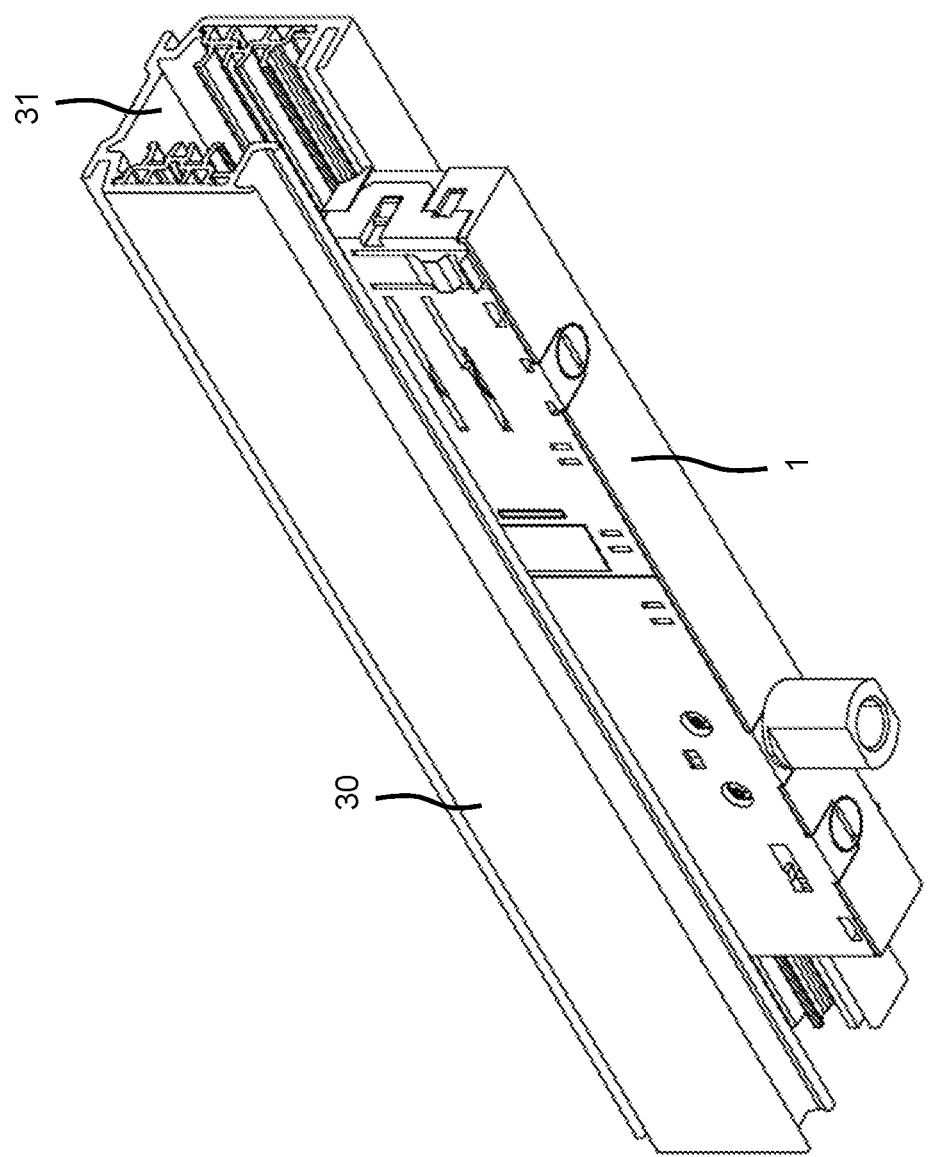
FIG. 7 shows a schematic view in perspective of an arrangement with a busbar adapter and a busbar.

FIG. 7 shows a schematic view in perspective of a busbar 30 with a mounting space 31, into which the busbar adapter 1 is to be inserted.

FIG. 8 shows another view in perspective of a busbar adapter with a first and a second housing component 18a, 18b.

The features disclosed in the above description, the claims, and the figures can be relevant, either individually or in any combination, to the implementation of the various embodiments.

The invention claimed is:

1. A busbar adapter, with
   a housing;
   contact elements, on each of which an electrical connection is formed, and which are displaceably arranged in the housing, in such a way that the contact elements can in each case be displaced between an extended position, in which the electrical connection protrudes outwards in the region of a side face on the housing, and by means of the electrical connection an electrical contact can be made with a busbar, and a retracted position, in which the electrical connection is arranged in the housing and the electrical contact is broken; and
   a single camshaft, which is arranged in the housing such that it can rotate, and has an arrangement of cams which, for purposes of actuating the contact elements, are each assigned to at least one of the contact elements, in such a way that the contact elements can each be displaced between the retracted and the extended positions by the rotation of the single camshaft,
   wherein at least a first cam is assigned to the arrangement of cams for the common actuation of two of the contact elements, which are arranged on opposite sides with respect to the single camshaft, in such a way that in different rotational positions of the single camshaft in each case exactly one of the two contact elements is displaced by means of the first cam into the extended position.

2. The busbar adapter in accordance with claim 1, wherein the feet of each of the contact elements are arranged on a contact block, which is detachably arranged in the housing.

3. The busbar adapter in accordance with claim 1 wherein
   a first of the contact elements has a cranked section, and
   a cam, which is associated with a second of the contact elements for purposes of actuating the second contact element, is arranged in a rotational position of the single camshaft in the region of the cranked section, and in another rotational position of the single camshaft outside the region of the cranked section.

4. The busbar adapter in accordance with claim 1, wherein the single camshaft is detachably arranged in the housing.

5. The busbar adapter in accordance with claim 1, wherein at least a second cam is assigned to the arrangement of cams for the actuation of just one of the contact elements, in such a way that the one contact element can be displaced between the retracted and the extended position by means of the second cam when the single camshaft is rotated.

6. The busbar adapter in accordance with claim 1, wherein the contact elements and the cams of the arrangement of cams are each arranged in a plurality of superimposed planes.

7. The busbar adapter in accordance with claim 1, wherein the single camshaft can be actuated without tools for purposes of rotation.

8. The busbar adapter in accordance claim 1, wherein
   the housing has a plurality of housing parts;
   the contact elements are arranged in a first housing part, and a driver circuit, with which a driver voltage is provided during operation, is arranged in a second housing part; and
   in the region of a housing connection, the end faces of the first and second housing parts are detachably connected to one another.

9. The busbar adapter in accordance with claim 8, wherein the region of a housing connection, the end face housing walls (19a, 19b) of the first and second housing parts are arranged lying one on top of the other.

10. An arrangement with a busbar, which has a mounting space for one or a plurality of busbar adapters, and a busbar adapter in accordance with claim 1 which is arranged the mounting space of the busbar.

11. The busbar adapter in accordance with claim 1, wherein the single camshaft is functionally coupled to a locking device, which, in a locked position, secures the single camshaft in an initial rotational position, and in an unlocked position, permits the single camshaft to be rotated.

12. The busbar adapter in accordance with claim 11, wherein the locking device has a locking element, which is preloaded against displacement from a locked position of the locking element, in which the locking device is locked, into an unlocked position of the locking element, in which the locking device is unlocked.

13. A method for connecting a bus bar adapter in a bus bar, comprising:
   provision of a busbar adapter with a housing and contact elements, on each of which an electrical connection is formed, and which are displaceably arranged in the housing, in such a way that the contact elements are each arranged between an extended position, in which the electrical connection protrudes outwards in the region of a side face on the housing, and by means of the electrical connection an electrical contact can be made with a busbar, and a retracted position, in which the electrical connection is arranged in the housing and the electrical contact is broken;
   arrangement of the busbar adapter in a busbar, and
   contact made by the busbar adapter in the busbar, wherein here a single camshaft, which is arranged in the housing of the busbar adapter such that it can rotate, and has an arrangement of cams, which are each assigned to at least one of the contact elements, is rotated in such a way that at least one of the contact elements is displaced from the retracted position into the extended position, and thereby makes contact with an electrical connection of the busbar, wherein at least a first cam is assigned to the arrangement of cams for the common actuation of two of the contact elements, which are arranged on opposite sides with respect to the single camshaft, in such a way that in different rotational positions of the single camshaft in each case exactly one of the two contact elements is displaced by means of the first cam into the extended position.

* * * * *